United States Patent [19]
Ikeda

[11] 3,979,683
[45] Sept. 7, 1976

[54] NOISE ELIMINATOR CIRCUIT
[75] Inventor: Tsuneo Ikeda, Oume, Japan
[73] Assignee: Hitachi, Ltd., Japan
[22] Filed: Jan. 6, 1975
[21] Appl. No.: 538,577

[30] Foreign Application Priority Data
Jan. 9, 1974 Japan................................ 49-5341

[52] U.S. Cl.............................. 328/165; 328/55;
178/7.3 S; 178/DIG. 12; 325/474
[51] Int. Cl.².......................................... H04B 1/10
[58] Field of Search..................... 328/55, 165, 167;
178/DIG. 12, 7.3 S, 36; 325/473, 474

[56] References Cited
UNITED STATES PATENTS

| | | | |
|---|---|---|---|
| 2,935,604 | 5/1960 | Di Toro | 325/474 |
| 3,437,834 | 4/1969 | Schwartz | 328/165 X |
| 3,528,019 | 9/1970 | Inoue | 325/474 |
| 3,602,737 | 8/1971 | Radecke | 328/167 X |
| 3,624,288 | 11/1971 | Hofmann | 328/165 X |
| 3,860,750 | 1/1975 | Ueda | 178/DIG. 12 |

Primary Examiner—John S. Heyman
Attorney, Agent, or Firm—Craig & Antonelli

[57] ABSTRACT

A noise eliminator circuit comprises a detector which detects whether or not the incoming signal exceeds a prescribed level, and an eliminator which eliminates noise signals above the predetermined level. Delay circuitry is coupled between the detector and the eliminator in order to prevent time delays from the point of detection to the point of noise elimination from interfering with the cancellation of the noise components.

13 Claims, 4 Drawing Figures

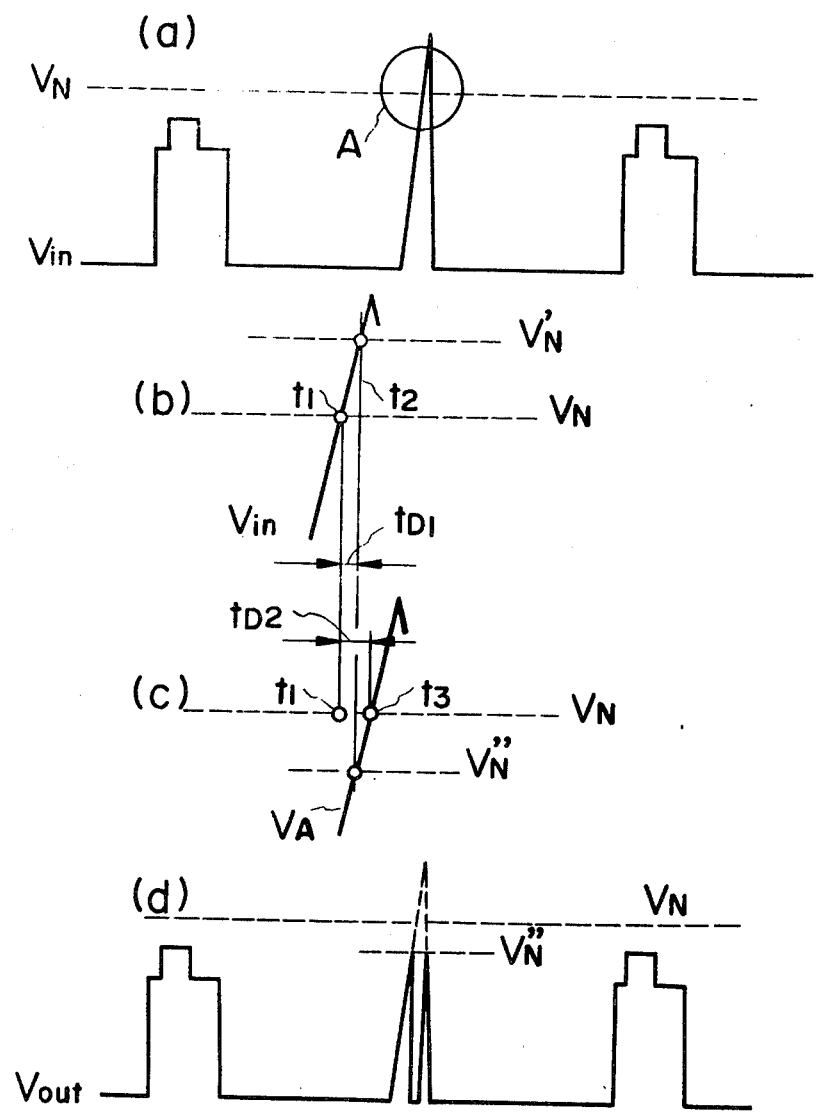

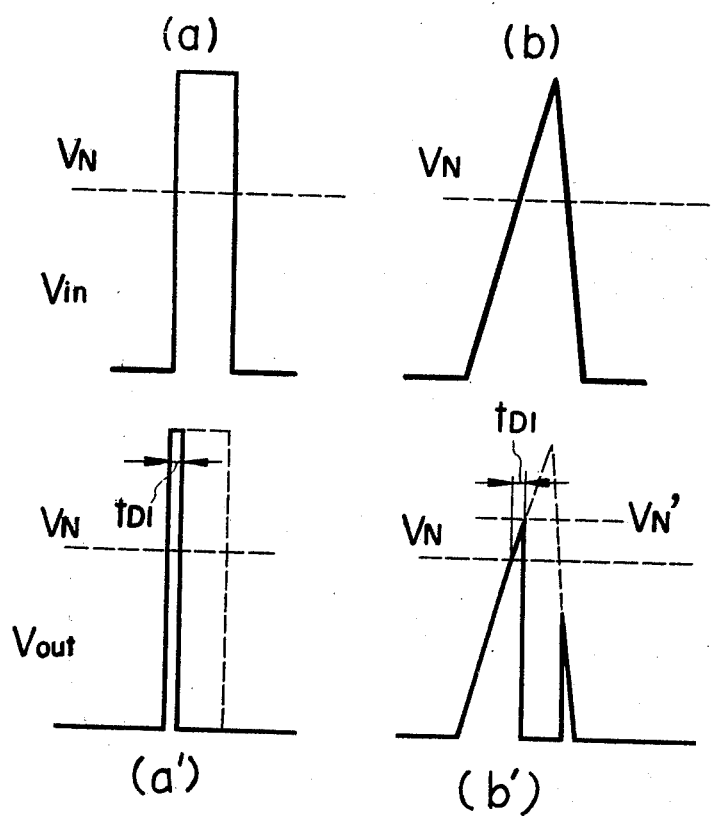

NOISE ELIMINATOR CIRCUIT

BACKGROUND OF THE INVENTION

The present invention relates to a noise eliminator circuit, and is principally concerned with the noise eliminator circuit in a television receiver.

DESCRIPTION OF THE PRIOR ART

In a television receiver, as the automatic gain control circuit (hereinafter referred to as AGC circuit) the types often employed are the keyed AGC circuit and the peak value type AGC circuit.

The keyed AGC circuit extracts the composite video signal during the period of a horizontal synchronizing pulse, by the use of a sampling pulse such as a fly-back pulse, and averages the output through a resistor-capacitor network, to provide an averaged output for AGC detection. However, the phase shift between the horizontal synchronizing signal and the sampling pulse interferes with the control which is provided by the keyed-type AGC circuit.

In the peak value type AGC circuit, the peak value of the synchronizing signal, in the composite video signal, is employed as the AGC detection output and is free from the phase shift mentioned above. However, this type of circuit is not immune to large pulse type noises, such as the ignition noise of an automobile, and requires a high performance noise eliminator circuit.

In one type of noise eliminator circuit, the noise pulse is separated from the composite video signal and is impressed on the original signal, 180° out of phase with the same, to cancel the noise component. In another type, the input circuit to the synchronizing pulse separator circuit is disconnected during the period of the noise pulse. In each of these types of systems, however, between the time of detection of signals which exceed a prescribed noise level and the time at which the signal is eliminated, there is a time delay, which interferes with the precise elimination of the noise. More specifically, the actual operation of noise elimination is delayed due to the operation time of the transistors in the voltage comparator circuit. Where the noise eliminator circuit is constructed of integrated semiconductor circuitry, the time delay may amount to approximately $0.05\mu$ sec.

For these reasons, if the input to the noise eliminator circuit has a very fast rise time, as exemplified by the input signal $V_{in}$ shown at signal (a) in FIG. 4, where the threshold noise level is $V_N$, then at the output of the noise eliminator circuit, there will appear the output signal shown at (a') in FIG. 4, $V_{out}$, in which the signal level still exceeds the threshold noise level $V_N$ during a period of time delay $t_{D1}$, so that the noise is substantially not eliminated.

Where the input signal to the noise eliminator circuit has a comparatively fast rise time, but not an extremely fast rise time, as shown at signal (b) of FIG. 4, the non-eliminated noise, which exceeds the noise threshold level $V_N$, will be contained in the output signal, shown at signal (b') of FIG. 4 during the period of time $t_{D1}$. In effect, this means that the threshold noise level has been increased to a new level of $V_N'$ above the intended level $V_N$.

When the non-eliminated noise appears at the output of the noise eliminator circuit, the output of the AGC circuit will fluctuate, since the AGC circuit utilizes the peak value of the signal as the AGC detection output.

BRIEF SUMMARY OF THE INVENTION

The present invention has been developed in order to eliminate the above-referred to problems and is directed to an improved noise eliminator circuit wherein the above-mentioned time delay between the detection of the noise and the elimination of the same is compensated. In order to provide this compensation, the delay circuitry is coupled between a signal which detects whether or not noise exists in the incoming signal and the noise eliminator circuit, proper, so that the output of the noise eliminator circuit will not contain the time delayed components discussed above.

BRIEF DESCRIPTION OF THE DRAWINGS

FIG. 3 illustrates various signal waveforms for explaining the operation of the invention; and FIG. 4 illustrates waveforms for explaining the defects of the prior art.

DETAILED DESCRIPTION

Figure 1:
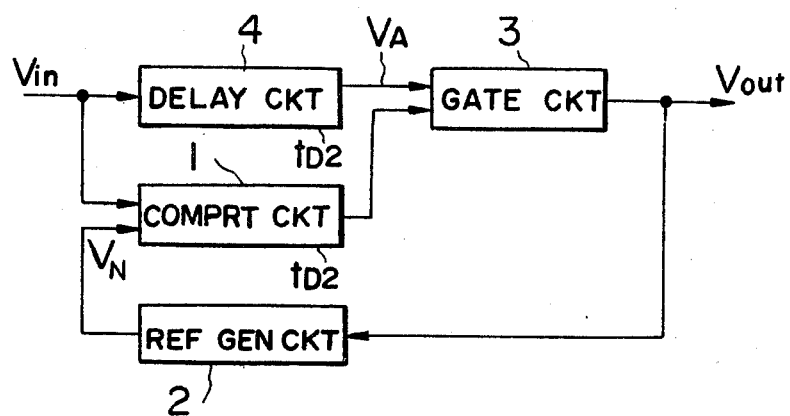
FIG. 1 is a block circuit diagram of an embodiment of the noise eliminator circuit in accordance with the present invention.

The block diagram of the noise eliminator circuit in accordance with the present invention shown in FIG. 1 is employed in a system in which the input circuit to a synchronizing pulse separator circuit is to be disconnected during the period of the noise pulse.

As is shown in the figure, an input signal $V_{in}$ is directly applied to one input of a comparator circuit 1, while the output of a reference voltage generator circuit 2, namely, a noise eliminating voltage level $V_N$ is applied to the other input of the comparator circuit 1. The comparator circuit compares both levels applied to the inputs thereof and provides an output when the level of the input signal $V_{in}$ exceeds the prescribed noise level $V_N$. Gate circuit 3, which receives the output of the comparator circuit as one input, is also coupled to the incoming voltage $V_{in}$ by way of a delay circuit 4. The gate circuit 3 is closed when the output of the comparator circuit 1 indicates the detection of noise in an incoming input signal. In order to provide a circuit which follows the level change in the input signal, the reference voltage generator circuit 2 has the output voltage $V_{out}$ of the gate circuit 3 as its reference.

Attention is now directed to FIG. 3, wherein the operation of the noise eliminator circuit shown in FIG. 1 will be explained.

For the signals shown in portion (a) of FIG. 3, the signal $V_{in}$, in the absence of noise, will have its peak amplitude beneath the threshold level $V_N$ so that the signal does not contain noise. However, where the signal exceeds the noise level $V_N$, as shown at encircled portion A, the comparator circuit of FIG. 1 will provide an output. The encircled portion A for the signal waveform shown at portion (a) of FIG. 3 is partially illustreated at portion (b) of FIG. 3 wherein the signal first exceeds the signal $V_N$ at time $t_1$. In the prior art, the gate circuit was not closed until time $t_2$, as shown in FIG. 4, so that in effect, the threshold level had been raised to a new level $V_{N'}$ due to the time delay $t_{D1}$.

In accordance with the present invention, as shown at portion (c) of FIG. 3, by virtue of the time delay imparted by way of delay circuit 4, shown in FIG. 1, when the input signal $V_{in}$ reaches the gate circuit, it will have already been delayed at a period of time sufficient to enable the comparator circuit to make a decision as to whether or not the input signal contains noise. Still, the gate circuit 3 will close at time $t_2$ just as it did in the prior art, but the signal which is to be passed therethrough will have been delayed. Consequently, where $t_{D1} < t_{D2}$ the noise is eliminated before the signal $V_A$ reaches the noise eliminating voltage level $V_N$. In other words, the noise eliminating voltage can be regarded as the level $V_{N''}$ as shown in the figure. As a result, the output voltage $V_{out}$ of the noise eliminator circuit is clipped at the level $V_{N''}$ which is below the level $V_N$ as illustrated a portion ($d$) of FIG. 3.

The noise eliminator circuit in accordance with the present invention lowers the threshold level of noise elimination so that it can remove that portion of the noise which was left uneliminated in the prior art, yet the circuit does not affect synchronizing signal levels lower than the noise eliminating level. Namely, a time delay of the delay circuit 4 is set at approximately $0.05\mu$ sec, since the operation of the comparator circuit 1 has a delay of approximately $0.05\mu$ sec., yet the pulse width of the synchronizing signal is much longer, i.e. on the order of $5\mu$ sec.

As will be understood from the foregoing description, the noise eliminator circuit of the present invention has a tendency to decrease the noise elimination threshold level for noises having a fast rise time, so that it is suitable for noise eliminator circuitry employed in a television receiver. As a result, the fluctuation of the AGC level due to noise in the AGC circuit can be permitted.

Preferably, the time delay $t_{D2}$ of the delay circuit 4 is set so that $t_{D1} < t_{D2}$. However, time delay $t_{D1}$ may be equal to or slightly greater than time delay $t_{D2}$ and the operation of the noise eliminating circuit in accordance with the present invention will be achieved.

Figure 2:
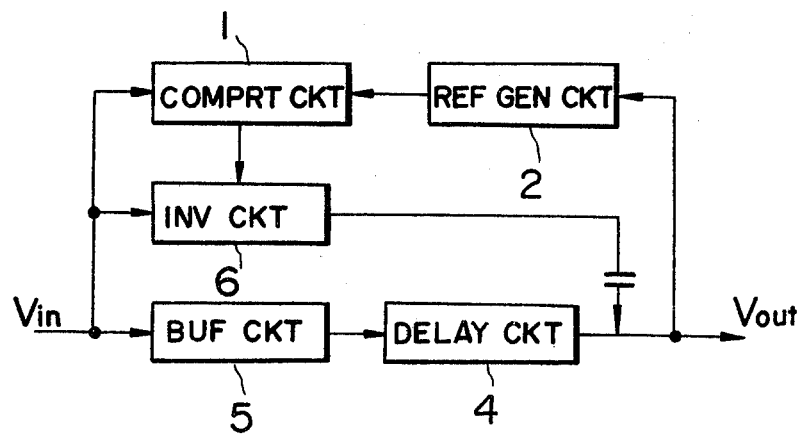
FIG. 2 is a block circuit diagram of another embodiment of the noise eliminator circuit in accordance with the present invention.

The present invention is also applicable to a noise eliminator circuit in which the noise is removed by adding to the original signal a noise signal shifted in phase by 180° to the original noise signal. Namely, as is illustrated in FIG. 2, the input signal $V_{in}$ passes through a buffer circuit 5 and is delayed by delay circuit 4. An inverter circuit 6 is also provided to invert the incoming signal which is capacitor-coupled to the output of the delay circuit. In order to eliminate noise which has a particular fast rise time, in this case, the delay circuit must be set so as to have both time delays equal.

Where the reference voltage generator circuit 2 receives the output $V_{out}$ of the noise eliminator circuit 3 as its reference voltage, in order to establish the noise eliminating voltage $V_N$, a continuous high frequency noise signal will overlie the synchronizing signal, especially for a weak field input signal $V_{in}$ so that the level of the signal which passes through the delay circuit 4 reaches a value with the integrated value of the noise superimposed on the peak value of the synchronizing value. As a result, there is a danger that the noise eliminaing level will have no reference with respect to the peak value of the synchronizing signal. To prevent this, the delay circuit may be provided with a filter or have a prescribed frequency characteristic in which it does not respond to noises for weak electric fields. Of course, the reference voltage may also be fixed.

While I have shown and described several embodiments in accordance with the present invention, it is understood that the same is not limited thereto but is susceptible of numerous changes and modifications as known to a person skilled in the art and I, therefore, do not wish to be limited to the details shown and described herein but intend to cover all such changes and modifications as are obvious to one of ordinary skill in the art.

I Claim:

1. In a noise eliminator circuit comprising:
   an input terminal to which an input signal from which a noise signal is to be removed is applied;
   an output terminal;
   first means, coupled to said input terminal, for detecting the existence of noise in said input signal; and
   second means, coupled to said first means, for removing said noise from said input signal and coupling the resulting signal to said output terminal;
   the improvement comprising
   third means, coupled between said input terminal and said second means, for delaying the application of said input signal to said second means.

2. The improvement according to claim 1, wherein said first means comprises a comparator circuit having first and second inputs and an output, its first input being coupled to said input terminal, its second input being coupled to receive a prescribed voltage level and its output being coupled to said second means.

3. The improvement according to claim 1, wherein said second means comprises a gate circuit having first and second inputs and an output, its first input being coupled to said third means, its second input being coupled to said first means, and its output being coupled to said output terminal.

4. The improvement according to claim 2, further including a voltage level generating circuit coupled between said output terminal and the second input of said comparator circuit for supplying said prescribed voltage level thereto.

5. The improvement according to claim 1, wherein said third means comprises a delay circuit, the delay period provided by which is no greater than the period of the detection carried out by said first means.

6. The improvement according to claim 2, wherein said second means comprises a gate circuit having first and second inputs and an output, its first input being coupled to said third means, its second input being coupled to the output of said comparator circuit, and its output being coupled to said output terminal.

7. The improvement according to claim 6, further including a voltage level generating circuit coupled between said output terminal and the second input of said comparator circuit for supplying said prescribed voltage level thereto.

8. The improvement according to claim 7, wherein third means comprises a delay circuit, the delay period provided by which is no greater than the period of the detection carried out by said comparator circuit.

9. The improvement according to claim 1, wherein said second means comprises an inverter circuit having an input, a control terminal and an output, its input being coupled to said input terminal, its control terminal being coupled to said first means, and its output being coupled to said output terminal.

10. The improvement according to claim 9, wherein said first means comprises a comparator circuit having first and second inputs and an output, its first input being coupled to said input terminal, its second input being coupled to receive a prescribed voltage level and its output being coupled to the control terminal of said inverter circuit.

11. The improvement according to claim 10, further including a voltage level generating circuit coupled between said output terminal and the second input of said comparator circuit for supplying said prescribed voltage level thereto.

12. The improvement according to claim 11, wherein third means comprises a delay circuit, the delay period provided by which is no greater than the period of the detection carried out by said comparator circuit.

13. In a noise eliminator circuit comprising:
an input terminal to which an input signal from which a noise signal is to be removed is applied;
an output terminal;
first means, coupled to said input terminal, for detecting the existence of noise in said input signal; and
second means, coupled to said first means, for removing said noise from said input signal and coupling the resulting sigal to said output terminal;
the improvement comprising
third means, coupled between said input terminal and said second means, having a delay time which is substantially equal to the operation delay time of said first means, for delaying the application of said input signal to said second means.

* * * * *